United States Patent [19]
Gale

[11] Patent Number: 5,178,119
[45] Date of Patent: Jan. 12, 1993

[54] COMBUSTION PROCESS AND FUEL SUPPLY SYSTEM FOR ENGINES

[75] Inventor: Nigel F. Gale, San Antonio, Tex.

[73] Assignee: Southwest Research Institute, San Antonio, Tex.

[21] Appl. No.: 804,996

[22] Filed: Dec. 11, 1991

[51] Int. Cl.[5] .............................................. F02B 47/08
[52] U.S. Cl. .......................... 123/570; 123/DIG. 12; 123/568; 60/619
[58] Field of Search .......... 123/3, 568, 570, DIG. 12; 60/614, 619, 620, 622

[56] References Cited

U.S. PATENT DOCUMENTS

| | | | |
|---|---|---|---|
| 2,113,602 | 7/1933 | Pratt | 123/1 |
| 3,808,818 | 5/1974 | Cataldo | 60/620 |
| 3,896,774 | 7/1975 | Siewert | 123/59 |
| 3,918,412 | 11/1975 | Lindstrom | 123/568 |
| 3,924,576 | 12/1975 | Siewert | 60/620 |
| 3,941,113 | 3/1976 | Baguelin | 123/179.21 |
| 3,958,540 | 5/1976 | Siewert | 123/59 |
| 4,059,076 | 11/1977 | Rosaka et al. | 123/3 |
| 4,159,700 | 7/1979 | McCrum | 60/619 |
| 4,175,523 | 11/1979 | Noguchi | 123/3 |
| 4,198,940 | 4/1980 | Ishida | 123/119 |
| 4,244,328 | 1/1981 | Lindstrom | 123/3 |
| 4,306,532 | 12/1981 | Camacho | 123/527 |
| 4,389,981 | 6/1983 | Meyer | 123/DIG. 12 |
| 4,520,763 | 6/1985 | Lynch et al. | 123/1 |
| 4,523,548 | 6/1985 | Engel et al. | 123/1 |
| 4,570,578 | 2/1986 | Peschka et al. | 123/1 |
| 4,715,326 | 12/1987 | Thring | 123/3 |
| 4,783,966 | 11/1988 | Aldrich | 60/622 |

FOREIGN PATENT DOCUMENTS 0015924 2/1977 Japan ................................. 123/3

Primary Examiner—E. Rollins Cross
Assistant Examiner—Erick Solis
Attorney, Agent, or Firm—Baker & Botts

[57] ABSTRACT

A fuel combustion process is provided for a multi-cylinder engine for reducing exhaust emissions of carbon monoxide and unburned hydrocarbons. The process includes the steps of introducing hydrocarbon fuel in a first engine cylinder, burning the hydrocarbon fuel and producing exhaust gases, introducing the exhaust gases in a second cylinder, introducing hydrogen in the second cylinder, and burning the hydrogen with the exhaust gases, thereby producing exhaust emissions having a lower carbon monoxide and unburned hydrocarbon content than that of the exhaust gases produced in the first cylinder.

14 Claims, 2 Drawing Sheets

COMBUSTION PROCESS AND FUEL SUPPLY SYSTEM FOR ENGINES

TECHNICAL FIELD OF THE INVENTION

This invention relates generally to engines. More particularly, but not by way of limitation, this invention relates to fuel supply systems and combustion processes for internal combustion engines utilizing hydrogen and hydrocarbon fuels.

BACKGROUND OF THE INVENTION

Normally when hydrocarbon fuels are burned in internal combustion engines, exhaust gases are produced containing significant quantities of pollutants like carbon monoxide, oxides of nitrogen and unburned hydrocarbons. Typically, after-treatment devices like oxidizing catalysts are used to reduce the pollutant content of the exhaust. However, an engine producing significant amounts of unburned hydrocarbons will have a low energy efficiency.

Attempts have been made in the past to cause more complete combustion of hydrocarbon fuels in internal combustion engines. For example, U.S. Pat. No. 4,198,940 issued to Ishida; U.S. Pat. No. 2,113,602 issued Pratt; U.S. Pat. No. 4,059,076 issued to Kosaka and U.S. Pat. Nos. 3,958,540; 3,896,774; and 3,924,576 issued to Siewert all disclose internal combustion engines, in which exhaust from one cylinder of the engine is delivered to and burned in a second cylinder to reduce the emission of unburned hydrocarbons.

When hydrogen is burned in an internal combustion engine, the exhaust generally comprises only water vapor and the oxides of nitrogen. It has been found that the emissions of the oxides of nitrogen can be reduced if the oxygen content of the charge is reduced to an amount below that normally present in the air. Thus, engines using hydrogen can be operated to produce exhaust gases having a very low pollutant content. However, hydrogen is expensive to produce and occupies approximately four times the volume of hydrocarbon fuel of the same energy potential.

An object of this invention is to provide an improved fuel supply system and combustion process for an internal combustion engine burning hydrocarbon fuel that significantly reduces exhaust emissions of carbon monoxide, oxides of nitrogen and unburned hydrocarbons without the need for after-treatment devices.

Another object of this invention is to provide an improved fuel supply system and combustion process for an internal combustion engine, enabling the engine to use hydrogen and hydrocarbon fuels to produce exhaust gases having a low pollutant content similar to exhaust gases produced by an engine burning only hydrogen.

SUMMARY OF THE INVENTION

In one aspect, this invention provides an improved fuel combustion process that reduces emissions of oxides of nitrogen, unburned hydrocarbons and carbon monoxide. The process includes the steps of introducing hydrocarbon fuel in a first engine cylinder, burning the hydrocarbon fuel and producing exhaust gases, introducing the exhaust gases in a second cylinder, introducing hydrogen in the second cylinder, and burning the hydrogen with the exhaust gases, thereby producing exhaust emissions having a lower carbon monoxide and unburned hydrocarbon content than that of the exhaust gases produced in the first cylinder.

In another aspect, this invention provides an improved engine fuel supply system for an internal combustion engine having first and second combustion chambers. The improved fuel supply system is provided for reducing exhaust emissions of oxides of nitrogen, unburned hydrocarbons and carbon monoxide. The system includes means for supplying fuel to the first combustion chamber, means for igniting the fuel in the first combustion chamber, thereby producing exhaust gases containing carbon monoxide and unburned hydrocarbons, means for delivering the exhaust gases from the first combustion chamber to the second combustion chamber, means for introducing hydrogen to the second combustion chamber, and means for igniting the exhaust gases and hydrogen, thereby producing exhaust emissions having a lower unburned hydrocarbon and carbon monoxide content than the exhaust gases produced in the first combustion chamber.

A technical advantage of this invention is that it provides combustion process and a fuel supply system for an engine that significantly reduces exhaust emissions of carbon monoxide and unburned hydrocarbons without the need for after-treatment devices.

Another technical advantage of this invention is that it provides an improved fuel supply system and a combustion process for an engine using hydrogen and hydrocarbon fuels that produces essentially the same exhaust emissions as an engine burning only hydrogen. Thus, the amount of hydrogen needed for the operation of the engine is significantly reduced.

BRIEF DESCRIPTION OF THE DRAWINGS

The foregoing and additional objects and advantages of the invention will become more apparent as the following detailed description is read in conjunction with the accompanying drawings, wherein like reference characters denote like parts in all views and wherein.

DETAILED DESCRIPTION OF THE INVENTION

Figure 1:
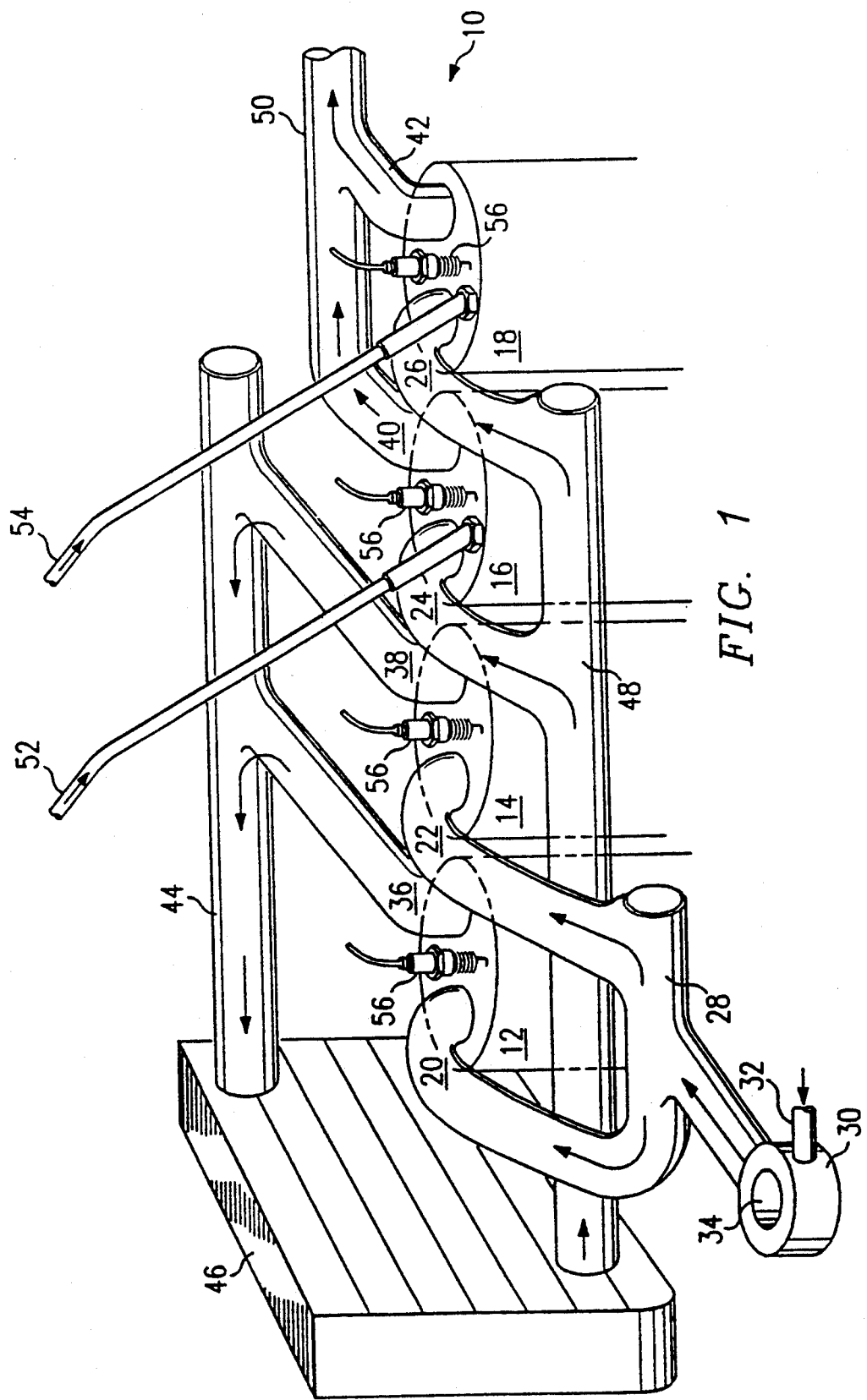
FIG. 1 illustrates a fuel supply system constructed in accordance with one embodiment of the invention that can be utilized with a lean fuel/air mixture.

FIG. 1 illustrates a fuel supply system constructed in accordance with one embodiment of the invention for use with an engine, which is generally designated by reference character 10. The engine 10 includes a plurality of cylinders 12, 14, 16 and 18, each comprising a combustion chamber for the engine. Each of the cylinders 12, 14, 16 and 18 is provided with an intake port connected to intake pipes 20, 22, 24 and 26, respectively. The intake pipes 20 and 22 are connected to an intake manifold 28, which in turn is connected to a carburetor 30. The carburetor 30 is provided for mixing fuel and air and delivering the fuel/air mixture to the cylinders 12 and 14. A fuel pipe 32 is connected to the carburetor 30 for supplying hydrocarbon fuel to the carburetor 30. Air to be mixed with the fuel is drawn into the carburetor 30 through an opening 34 therein.

While the drawing illustrates the use of a carburetor fuel system, the fuel system may be a natural gas system with its attendant controls or may be a fuel injection system. If desired, the air taken into the engine may be filtered.

Each of the cylinders 12, 14, 16, and 18 is provided with an exhaust port connected to exhaust pipes 36, 38, 40 and 42, respectively. The exhaust pipes 36 and 38 are connected to a pipe 44, which delivers exhaust gases from the cylinders 12 and 14 to a heat exchanger or an intercooler 46 provided for cooling the exhaust gases. An intake manifold 48 is connected to the intercooler 46 and to the intake pipes 24 and 26 for allowing exhaust gases passing through the intercooler 46 to be delivered to the cylinders 16 and 18.

The exhaust pipes 40 and 42, which extend from the cylinders 16 and 18, respectively, are connected to an exhaust manifold 50, which releases exhaust gases from the cylinders 16 and 18 into the atmosphere.

The cylinders 16 and 18 are each provided with a hydrogen intake port connected to hydrogen intake pipes 52 and 54, respectively. Hydrogen intake pipes 52 and 54 are connected to a hydrogen source (not shown), which supplies hydrogen to the cylinders 16 and 18.

Each of the cylinders 12, 14, 16 and 18 is provided with a spark plug 56 or similar fuel igniting device for initiating the combustion of fuel in the cylinders. Although not shown, it will be understood that appropriate fuel control or throttling devices and appropriate ignition controls will be provided for the engine 10.

Operation of the Embodiment of FIG. 1

In the operation of the engine 10, a lean hydrocarbon fuel/air mixture having excess air is formed in the carburetor 30 and delivered to the cylinders 12 and 14 through intake pipes 20 and 22, respectively. In the cylinders 12 and 14, the fuel/air mixture is ignited by the spark plugs 56, producing exhaust gases containing oxygen, oxides of nitrogen, carbon monoxide and unburned hydrocarbons. Because a lean fuel/air mixture is used, the exhaust contains reduced amounts of carbon monoxide and oxides of nitrogen. The exhaust gases flow through exhaust pipes 36 and 38, into pipe 44 and through the intercooler 46. In the intercooler 46, the exhaust gas temperature is lowered so that premature combustion will not occur when the exhaust gases are later introduced into cylinders 16 and 18 with hydrogen.

Upon leaving the intercooler 46, the exhaust gases flow through the intake manifold 48 and into the cylinders 16 and 18. At the same time, hydrogen is injected into the cylinders 16 and 18 through the hydrogen intake pipes 52 and 54, respectively. The cylinders 16 and 18 now contain a combination of exhaust gases and hydrogen, which is then ignited by spark plugs 56. The resulting combustion in the cylinders 16 and 18 causes oxidation of the carbon monoxide present in the cylinders 16 and 18, forming carbon dioxide. The combustion also causes burning of the unburned hydrocarbons present in the exhaust gases. Thus, the resulting exhaust emissions from the cylinders 16 and 18 include substantially reduced quantities of carbon monoxide and unburned hydrocarbons as compared to the exhaust gases produced by the cylinders 12 and 14. The combustion of hydrogen in the cylinders 16 and 18 produces emissions of essentially water vapor and small quantities of oxides of nitrogen. Since the oxygen content of the exhaust gases from the cylinders 12 and 14 is lower than that normally present in the air, emissions of the oxides of nitrogen are reduced. The exhaust produced from cylinders 16 and 18 is fed through the exhaust pipes 40 and 42 into the exhaust manifold 50 and then released into the atmosphere.

Each of the cylinders 12, 14, 16 and 18 supplies the output power of the engine. It should be noted that while four cylinders are shown in the embodiment of FIG. 1, any number of cylinders can be provided. Also, the number of cylinders burning only hydrocarbon fuel need not be the same number of cylinders burning the combination of exhaust gases and hydrogen. It should be further noted that while FIG. 1 shows a spark ignition engine, a compression ignition engine may be provided so that diesel fuel may be utilized as the hydrocarbon fuel. In addition, it should be noted that hydrocarbon derivatives like alcohol may be used for the hydrocarbon fuel.

Figure 2:
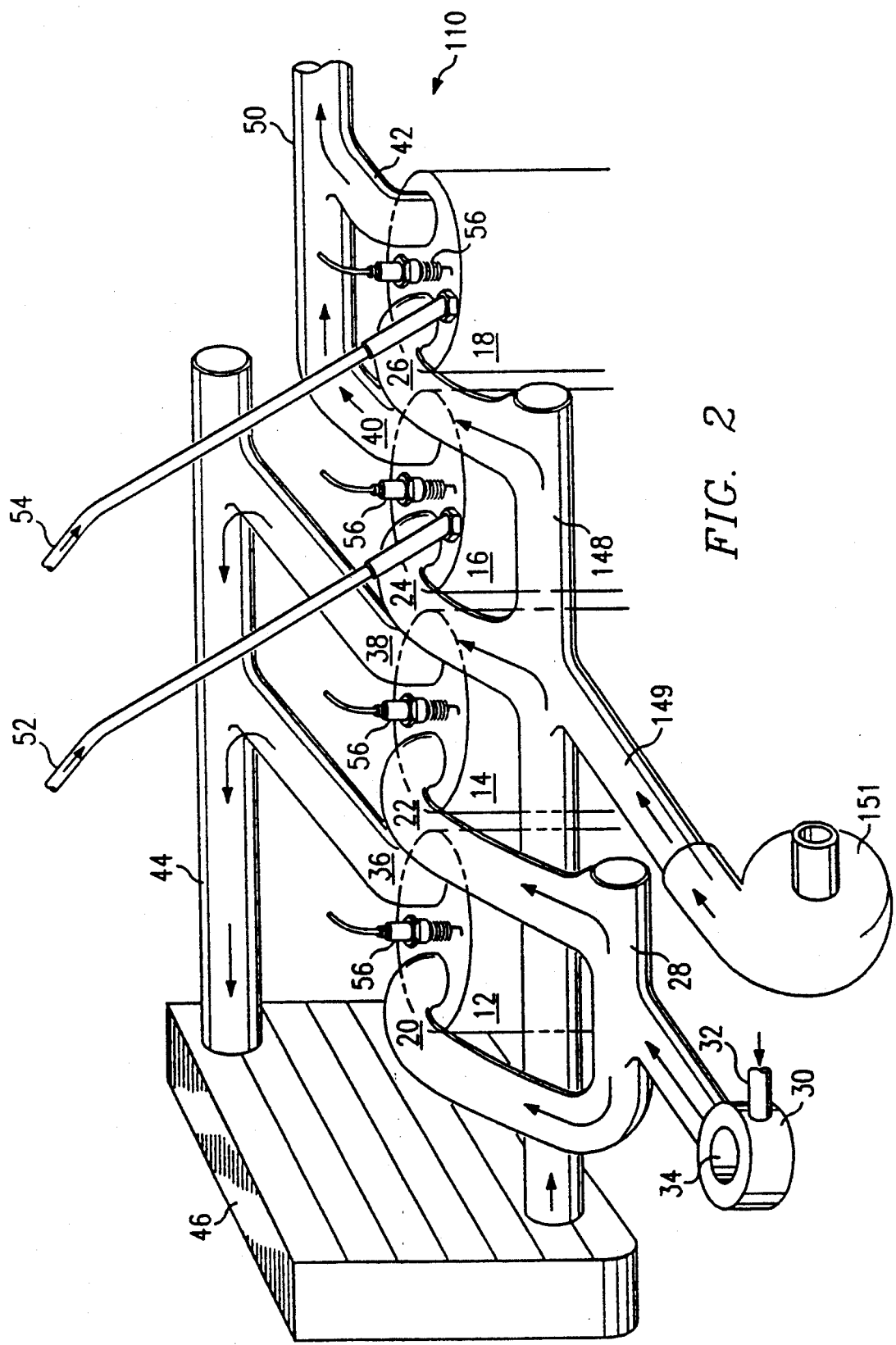
FIG. 2 illustrates a fuel supply system constructed in accordance with another embodiment of the invention that can be utilized with a rich fuel/air mixture.

The Embodiment of FIG. 2

FIG. 2 illustrates an embodiment of the invention similar to the FIG. 1 embodiment, but suitable for use with rich fuel/air mixtures. FIG. 2 illustrates a fuel supply system for an engine generally designated by reference character 110. The engine 110, like the engine 10, includes the plurality of cylinders 12, 14, 16 and 18, each comprising a combustion chamber for the engine 110. Each of the cylinders 12, 14, 16 and 18 is provided with an intake port connected to the intake pipes 20, 22, 24 and 26, respectively. The intake pipes 20 and 22 are connected to the intake manifold 28, which in turn is connected to the carburetor 30. The carburetor 30 is provided for mixing fuel and air and delivering the fuel/air mixture to the cylinders 12 and 14. The fuel pipe 32 is connected to the carburetor 30 for supplying hydrocarbon fuel to the carburetor 30. Air to be mixed with the fuel is drawn into the carburetor 30 through the filtered opening 34 therein.

Each of the cylinders 12, 14, 16 and 18 is provided with an exhaust port connected to exhaust pipes 36, 38, 40 and 42, respectively. The exhaust pipes 36 and 38 are connected to a pipe 44, which delivers exhaust gases from the cylinders 12 and 14 to the heat exchanger or intercooler 46. An intake manifold 148 is connected to the intercooler 46 and to the intake pipes 24 and 26 for delivering exhaust gases passing through the intercooler 46 to the cylinders 16 and 18. The intake manifold 148 is also connected to an air intake pipe 149, which supplies additional air to the cylinders 16 and 18 from a supercharger or turbocharger 151.

The exhaust pipes 40 and 42, which extend from the cylinders 16 and 18, respectively, are connected to the exhaust manifold 50, which releases exhaust gases from the cylinders 16 and 18 into the atmosphere. The cylinders 16 and 18 are each provided with a hydrogen intake port connected to hydrogen intake pipes 52 and 54, respectively. Hydrogen intake pipes 52 and 54 are connected to a hydrogen source (not shown), which supplies hydrogen to the cylinders 16 and 18.

Each of the cylinders 12, 14, 16 and 18 is provided with a spark plug 56 or similar fuel igniting device for initiating combustion of fuel in the cylinders. Although not shown, it will be understood that appropriate fuel control or throttling devices and appropriate ignition controls will be provided for the engine 110.

Operation of the Embodiment of FIG. 2

In the operation of the engine 110, a rich fuel/air mixture well above the stoichiometric range is formed in the carburetor 30 and delivered to the cylinders 12 and 14 through intake pipes 20 and 22, respectively. In the cylinders 12 and 14, the fuel/air mixture is ignited by the spark plugs 56, producing exhaust gases containing oxides of nitrogen, carbon monoxide and unburned hydrocarbons. Since the fuel/air mixture is hydrocarbon rich, few oxides of nitrogen are produced during combustion. However, a substantial amount of unburned hydrocarbons and carbon monoxide emissions are produced.

The exhaust gases produced from the cylinders 12 and 14 flow through the exhaust pipes 36 and 38, into pipe 44 and through the intercooler 46. In the intercooler 46, the exhaust gas temperature is lowered so that premature combustion will not occur when the exhaust gases are later introduced into the cylinders 16 and 18 with hydrogen.

Upon leaving the intercooler 46, the exhaust gases flow through the intake manifold 148 and into the cylinders 16 and 18. Since the fuel/air mixture burned in the cylinders 12 and 14 was hydrocarbon rich, there is insufficient excess oxygen in the exhaust necessary for proper combustion in the cylinders 16 and 18. Consequently, added air is supplied to the cylinders 16 and 18 through the air intake pipe 149 from the supercharger or turbocharger 151. At the same time, hydrogen is injected into the cylinders 16 and 18 through the hydrogen intake pipes 52 and 54, respectively. The cylinders 16 and 18 now contain a combination of exhaust gases, hydrogen and added air, which is then ignited by the spark plugs 56. The resulting combustion in the cylinders 16 and 18 causes oxidation of carbon monoxide, forming carbon dioxide. The combustion also causes burning of unburned hydrocarbons present in the exhaust gases. Thus, the resulting exhaust emissions from the cylinders 16 and 18 include substantially reduced quantities of carbon monoxide and unburned hydrocarbons as compared to the exhaust gases produced by the cylinders 12 and 14. The combustion of hydrogen in the cylinders 16 and 18 produces emissions of essentially water vapor and the oxides of nitrogen. The exhaust produced from the cylinders 16 and 18 is fed through the exhaust pipes 40 and 42, into the exhaust manifold 50 and then released into the atmosphere.

Each of the cylinders 12, 14, 16 and 18 supplies output power of the engine 110. It should be noted that while four cylinders are shown in the embodiment of FIG. 2, any number of cylinders may be used. Also, the number of cylinders burning only hydrocarbon fuel need not be the same number of cylinders burning a combination of exhaust gases and hydrogen. In addition, it should be noted that hydrocarbon derivatives like alcohol may be used for the hydrocarbon fuel.

The FIG. 2 embodiment may be operated with both lean and rich fuel/air mixtures to control the power output of the engine 110. At a light load, a lean fuel/air mixture could be provided to the cylinders 12 and 14 of the engine 110 with no added air from the supercharger or turbocharger 151. At a full load, a rich fuel/air mixture could be supplied to the engine 110 along with additional air from the supercharger or turbocharger 151.

The foregoing embodiments, which have been described in detail, are presented by way of example only and it will be understood that many changes and modifications can be made thereto without departing from the spirit of the invention.

What is claimed is:

1. A fuel combustion process for a multi-cylinder engine for reducing exhaust emissions of carbon monoxide and unburned hydrocarbons, the process comprising the steps of:
   introducing hydrocarbon fuel in a first engine cylinder;
   burning the hydrocarbon fuel in the first engine cylinder, thereby producing exhaust gases containing carbon monoxide, unburned hydrocarbons and oxides of nitrogen;
   introducing the exhaust gases into a second engine cylinder;
   introducing hydrogen in the second engine cylinder; and
   burning the hydrogen with the exhaust gases in the second cylinder to produce exhaust emissions having a lower carbon monoxide and unburned hydrocarbon content than the exhaust gases produced in the first cylinder.

2. The method of claim 1, further including the step of cooling the exhaust gases produced in the first cylinder prior to said step of introducing the exhaust gases into the second cylinder to inhibit premature combustion of the exhaust gases and the hydrogen in the second cylinder.

3. The method of claim 1, wherein said step of introducing hydrocarbon fuel in a first cylinder comprises introducing a rich hydrocarbon fuel and air mixture in the first cylinder to reduce the generation of oxides of nitrogen and wherein the method further comprises introducing air into the second cylinder prior to said step of burning the hydrogen with the exhaust gases in the second cylinder.

4. The method of claim 1, wherein said step of introducing hydrocarbon fuel in a first cylinder comprises introducing a lean hydrocarbon fuel and air mixture in the first cylinder to reduce generation of carbon monoxide and oxides of nitrogen.

5. The method of claim 1, wherein said step of introducing hydrocarbon fuel in a first cylinder comprises introducing gasoline in the first cylinder.

6. The method of claim 1, wherein said step of introducing hydrocarbon fuel in a first cylinder comprises introducing diesel fuel in the first cylinder.

7. The method of claim 1, wherein said step of introducing hydrocarbon fuel in the first cylinder comprises introducing alcohol in the first cylinder.

8. An engine fuel supply system for reducing exhaust emissions of unburned hydrocarbons and carbon monoxide from an internal combustion engine having first and second combustion chambers, the fuel supply system comprising:
   means for supplying fuel to the first combustion chamber;
   means for igniting the fuel in the first combustion chamber, thereby producing exhaust gases containing carbon monoxide, unburned hydrocarbons and oxides of nitrogen;
   means for delivering the exhaust gases from the first combustion chamber to the second combustion chamber;
   means for introducing hydrogen to the second combustion chamber; and
   means for igniting the exhaust gases and hydrogen in the second combustion chamber, thereby producing exhaust emissions having a lower unburned hydrocarbon and carbon monoxide content than the exhaust gases produced from the first combustion chamber.

9. The engine fuel supply system of claim 8, wherein said means for delivering the exhaust gases from the first combustion chamber to the second combustion chamber include means for cooling the exhaust gases to inhibit premature combustion of the gases when introduced to the second combustion chamber with the hydrogen.

10. The engine fuel supply system of claim 9, wherein said means for cooling the exhaust gases comprise a heat exchanger.

11. The engine fuel supply system of claim 8, wherein said means for supplying the fuel comprise means for supplying a rich hydrocarbon fuel and air mixture for reducing the generation of oxides of nitrogen in the first chamber and wherein the fuel supply system further comprises means for supplying air to the second combustion chamber.

12. The engine fuel supply system of claim 11, wherein said means for supplying air comprise a turbocharger.

13. The engine fuel supply system of claim 8, wherein said means for supplying the fuel comprise means for supplying a lean hydrocarbon fuel and air mixture for reducing the generation of carbon monoxide and oxides of nitrogen in the first chamber.

14. A fuel combustion process for a multi-cylinder internal combustion engine for reducing exhaust emissions of oxides of nitrogen, the process comprising:
burning hydrocarbon fuel in a first cylinder of the engine to generate exhaust gases having an oxygen content less than that of air;
introducing the exhaust gases into a second cylinder of the engine;
introducing hydrogen into the second cylinder; and
burning the hydrogen and exhaust gases in the second cylinder, thereby producing exhaust emissions having a lower oxides of nitrogen content than exhaust gases that would be produced if the hydrogen were burned with air.

* * * * *